United States Patent [19]

Reymond et al.

[11] Patent Number: 4,494,201
[45] Date of Patent: Jan. 15, 1985

[54] MOVING-MAP DISPLAY WITH RECORDING ON PHOTOGRAPHIC FILM

[75] Inventors: Jean-Claude Reymond; Gilles Bertrand; Roland Gabanou, all of Paris, France

[73] Assignee: Thomson-CSF, Paris, France

[21] Appl. No.: 372,332

[22] Filed: Apr. 27, 1982

[30] Foreign Application Priority Data

Apr. 27, 1981 [FR] France ................. 81 08346

[51] Int. Cl.³ ............................................. G06F 15/50
[52] U.S. Cl. ................................. 364/449; 364/521; 364/443; 340/995
[58] Field of Search .............. 364/449, 447, 448, 443, 364/521, 444; 73/178 R; 353/12, 23, 26 A, 26 R; 340/24, 995; 346/110 R, 107 R

[56] References Cited

U.S. PATENT DOCUMENTS

| | | | |
|---|---|---|---|
| 3,652,836 | 3/1972 | Richardson et al. | 73/178 R |
| 4,138,726 | 2/1979 | Girault et al. | 364/443 |
| 4,253,150 | 2/1981 | Scovill | 364/449 |

FOREIGN PATENT DOCUMENTS 2357022  4/1981  France .
WO79/00175  4/1979  PCT Int'l Appll. .

*Primary Examiner*—Errol A. Krass
*Assistant Examiner*—Thomas G. Black
*Attorney, Agent, or Firm*—Oblon, Fisher, Spivak, McClelland & Maier

[57] ABSTRACT

Moving-map display for bringing about the precise position control of the area of the film to be displayed transversely in "x" (longitude) by purely electronic and static means and longitudinally in y (latitude) by using the lateral perforations of the film. To this end it has a computer which processes, as a function of the longitude and heading, the line-by-line scanning data of the useful area to be displayed and, as a function of the latitude, the positioning data in "y" by cyclically carrying out a lateral scan along the perforations where there are coded inscriptions in such a way as to process a signal corresponding to the variation in "y" to be cancelled out by controlling a servo-motor.

10 Claims, 9 Drawing Figures

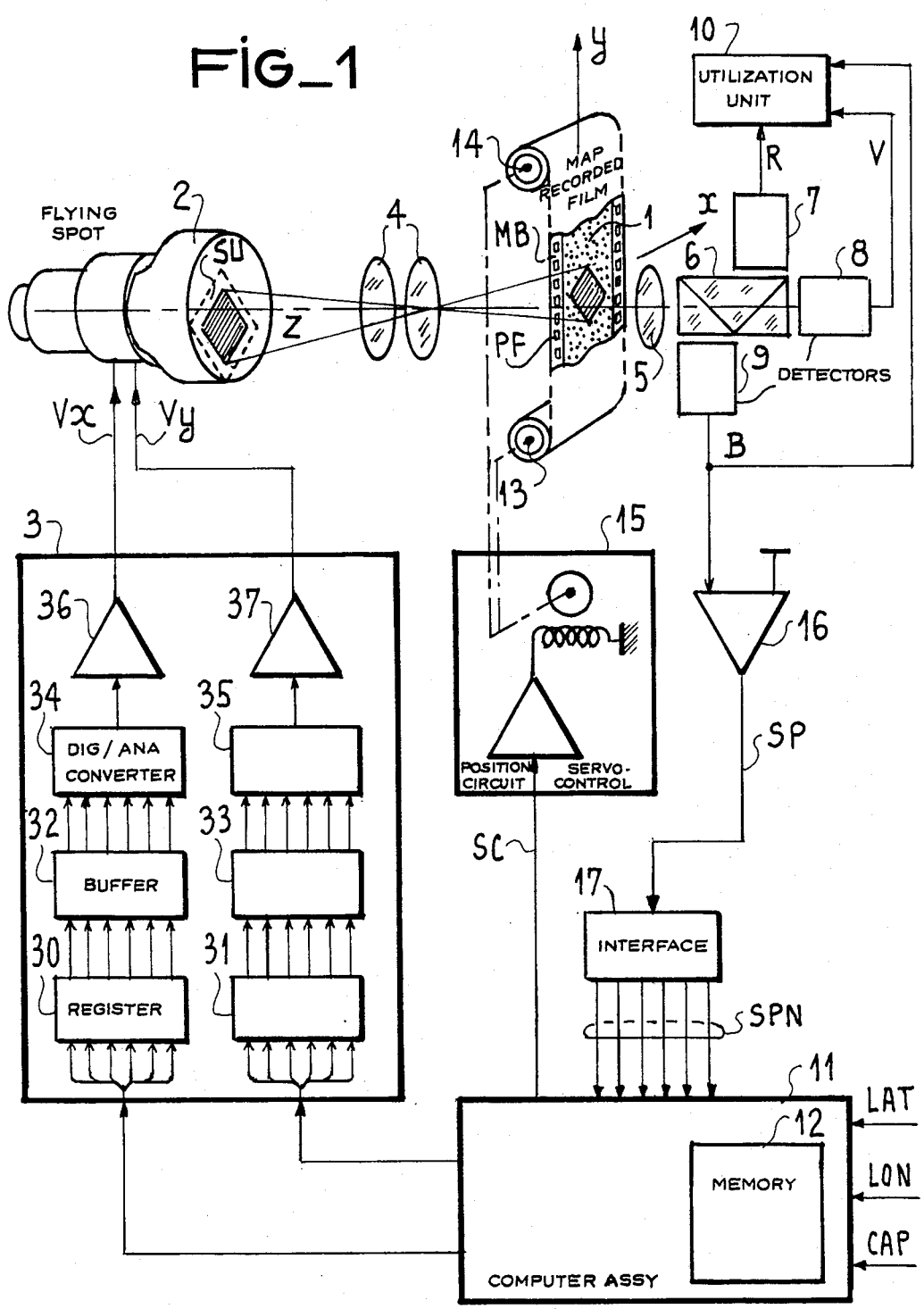

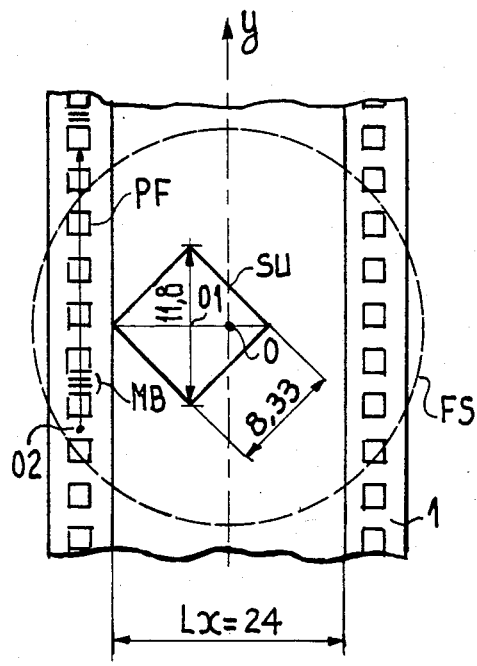
FIG_2
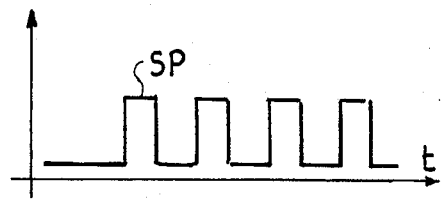
FIG_4·a
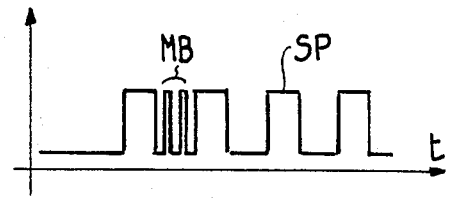
FIG_4·b
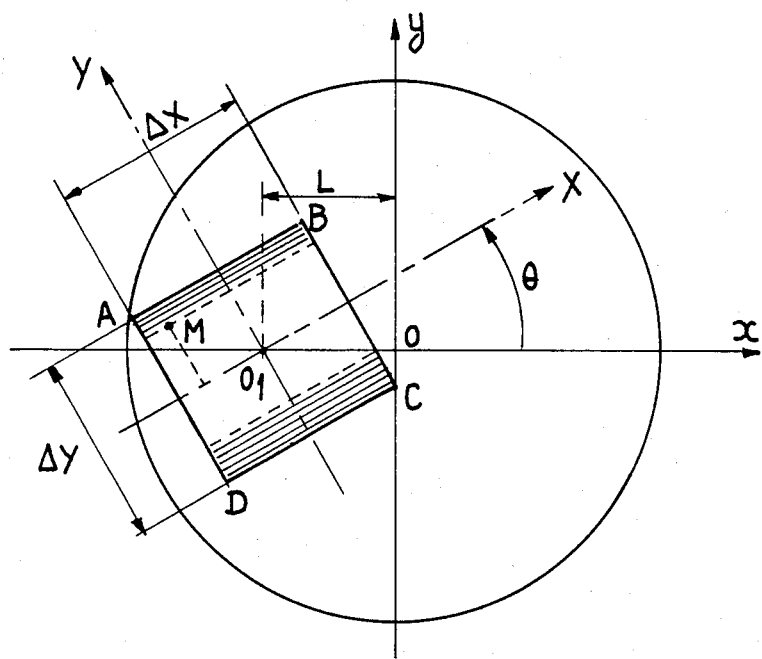
FIG_3

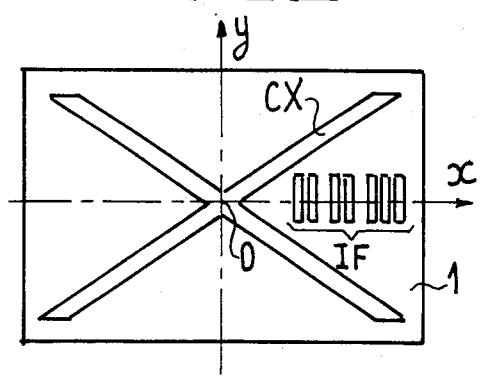
FIG_6
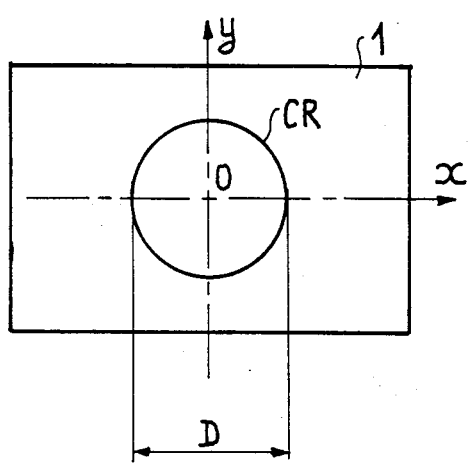
FIG_7
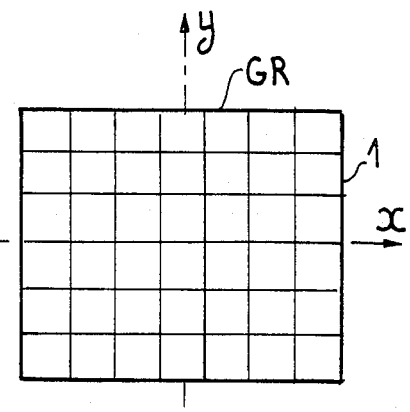
FIG_8
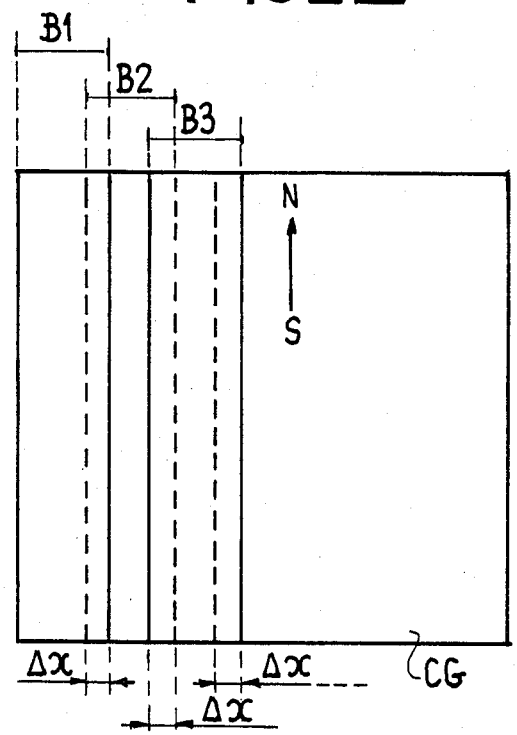
FIG_5

MOVING-MAP DISPLAY WITH RECORDING ON PHOTOGRAPHIC FILM

BACKGROUND OF THE INVENTION

The present invention relates to a moving-map display with the recording of the map on a photographic film.

Moving-map displays of the aforementioned type are used for displaying a moving geographical or topographical map on board a vehicle and are more particularly used for aerial navigation. In connection with the latter the image of the map displayed on a cathode-ray indicator represents the overflown area and to the same map are generally added symbols and markings relative to navigational parameters and to the position of the aircraft. The displayed image must move in the same way as the ground beneath the aircraft and its positioning must therefore be automatically controlled in x, y and θ, corresponding respectively to the longitude, latitude and heading data of the aircraft, said data being supplied by the navigational system equipping the aircraft. The moving-map display incorporates a computer which processes, on the basis of the aforementioned data, image position servo-control signals in x, y and θ.

French Pat. No. 2,357,022, corresponding to U.S. Pat. No. 4 138 726 describes a moving-map display incorporating the map recorded on a photographic film carried by spools, a video image reader on the basis of a line-by-line scan, means for the automatic control of the image as a function of the latitude, longitude and heading and switching circuits for the video image reading signals. The video image reader incorporates either a light source and a television camera, or a flying-spot tube and a photodetector (photomultiplier or the like), optical elements for image transfer and focusing and a camera or flying-spot tube scanning signal generator. In the case of a colour film it is necessary to add a trichromatic optical filter and three photodetectors or shooting cameras in place of one element.

The on-board computer processes as a function of the heading θ the scanning voltage corrections for rotating the image by a corresponding quantity, as a function of the latitude y a film position servo-control by rotating the spools, and as a function of the longitude x a mirror position servo-control ensuring, by optical deflection of the light radiation emitted by the source or flying-spot, the corresponding displacement of the scanned image. The switching signals incorporate a TV monitor preceded by circuits for video mixing with the symbol signals or for carrying out a desired processing or for local video channel switching operations.

BRIEF SUMMARY OF THE INVENTION

One object of the invention is to bring about the movement in x by purely electronic and therefore static means, in such a way as to prevent the various disadvantages linked with electromechanical solutions requiring the displacement of the mechanical parts, such as a mirror or the like. These disadvantages lead to increased overall dimensions, an excessive weight, possible lack of robustness, a disadvantageous response time constant, limited precision and sensitivity to accelerations.

With a view to increasing precision, the longitudinal movement (in y) is brought about in a special way, involving a fine resetting dependent on latitude variations.

It is an object of the invention to provide a moving-map display in which the computer processes scanning data, whilst taking account both of the rotation due to the heading and translations in x, i.e. transverse with respect to the film due to longitude variations, the computer also controlling in a cyclic manner a scan in y of the lateral perforations, the corresponding video signal being applied to a threshold detection circuit for producing the longitudinal position data and permitting the calculation of the resetting data in y to be transmitted to the servo-motor.

BRIEF DESCRIPTION OF THE DRAWINGS

The invention is described in greater detail hereinafter relative to non-limitative embodiments and the attached drawings, wherein show:

FIG. 1 a general diagram of a moving-map display according to the invention.

FIG. 2 a diagram showing on a portion of a film a possible dimensioning for the useful image to be displayed.

FIG. 3 a diagram illustrating the movements of the useful area as a function of the longitude and heading.

FIGS. 4a and 4b wave shapes relative to the scanning of the lateral perforations or tracks.

FIG. 5 a possible map cutting system in the case of recording on film.

FIG. 6, test images for the initialization 7 and 8 of the positioning, intermediate controls and linearity control respectively.

DETAILED DESCRIPTION OF THE PREFERRED EMBODIMENTS

The moving-map display must read the film position corresponding to the image of the topographical map to be displayed. To achieve this result means are used permitting the transverse displacement (in x) of the information representing the longitudinal movement of the vehicle, the displacement in the longitudinal direction (in y) to represent the latitude movement, generally also the rotation of the image on itself (in θ) to take account of the heading followed and in an auxiliary manner the resetting or readjustment of the analysis spot and a control of the linearity as a result of the reading or scanning of the test images.

FIG. 1 shows a possible embodiment of the moving-map display according to the invention. In the upper part of the video image reader there is a film 1 carrying the photographic recording of the topographical map. The light source is the spot of the flying-spot tube 2, which has a high luminance and the spot has a very small diameter of about 10 microns. Line-by-line scanning takes place and the corresponding deflection signals are supplied by a scan generator or circuit 3. An optical objective 4 forms the image of the front face of tube 2 on film 1. The light emitted by the spot is modulated by the transparency of the film during the passage thereof and is received by a condenser 5, which channels it towards the input of a trichromatic filter 6 in the presently considered case of a colour film. The three channels red R, green V and blue B are detected by elements 7, 8 and 9 such as e.g. photomultipliers in order to produce video signals for processing at 10 and colour display or visualization.

Objective 4 is such that the image FS of the complete front face of tube 2 covvers the entire length of the film to be scanned, as is shown in FIG. 2. In reality all that it is wished to display on the screen is the information contained in a useful area SU having a rectangular, square or other shape, and whose dimensions are well below the width Lx of the recording on the film. This useful area SU corresponds to the image to be displayed. As a result of an appropriate control of the scans in x and y of the scanning tube, it is possible to have access to any point of the film within the useful area SU. This control is produced by means of a computer or processor 11, programmed for this purpose and which receives latitude LAT, longitude LON and heading CAP parameters and which on the basis of these data controls the scanning generator 3. Details of this control are described hereinafter, particularly with respect to FIG. 3. Zone ABCD represents the useful area SU of the film to be scanned. The coordinate axis system Oy, Ox is constituted by the median longitudinal direction Oy of the film passing through the center of the latter and equidistant of the lateral perforations PF, and by the orthogonal direction Ox passing through the center 01 of the useful area ABCD. Thus, L is the distance 001 and point 0 corresponds to the image of the electrical center of tube FS. Area ABCD has undergone a rotation of angle $\theta$ relative to Ox. M is the scan point obtained by adequate voltages Vx and Vy applied to the tube, whilst X and Y are the coordinates of M relative to the Cartesian coordinate axis system O1X, O1Y, passing through 01 and having rotation $\theta$. The passage from one coordinate system to the other results from the rotation $\theta$ and of the translation 001 of the absolute value L. Thus, the coordinates x, and y of M in system Oxy are given by the known relationships:

$$x = X \cos\theta - Y \sin\theta - L$$
$$y = X \sin\theta + Y \cos\theta$$

Computer 11 can be based on a microprocessor and at all times determines the values x and y of successive points M to be scanned in area ABCD in accordance with a line-by-line scan. Thus, account is taken of the heading (rotation $\theta$) and the longitude (distance 001). With respect to the latitude (position of 0 along the median longitudinal axis y), the action takes place by the longitudinal positioning of the film.

The data x and y of the successive points M of the scan are processed by computer 11, which transmits them to a scan circuit 3 where conversion takes place into the analog output signals Vx and Vy to be transmitted to the deflection members of tube 2. In the manner shown the scan circuit 3 may incorporate flip-flop registers 30, 31 receiving digital data x,y of M and transferring the data x,y to buffer stores 32 and 33 where said data are stored, constituting respectively the address in x and the address in y of the scan, the digital-analog conversion circuits 34, 35 and power amplifiers 36, 37. Computer 11 has a store 12, whereof part can be used for storing scanning data x, y and for then ensuring "refreshing" as a function of the evolution of the three input parameters.

Thus, there has been an electronic adjustment both in x and in $\theta$ of the image and which involves no mechanical parts.

Film 1 is wound on to the supporting spools 13 and 14 for the positioning in y. Computer 11 processes the command SC of a position servo-control 15 on the basis of latitude LAT and the position information carried by the film. The latter is obtained in a particular and very precise manner by using the lateral perforations PF of the film. The perforations of a film are produced with particular care and accuracy and can be used as markers when shooting by means of a positioning device, which cancels out errors due to the actual tolerances. With this objective, computer 11 cyclically controls the scan generator or circuit 3 to pass through the spot a line of direction y substantially positioned towards the center of a lateral row of perforations PF, as indicated in FIG. 2. This special scan is controlled during an available time interval, e.g. during frame blanking. The corresponding signal is tapped on one of the video channels (or the single channel in the case of monochromatic scanning) and is applied to a reshaping circuit, such as a threshold detector 16 for eliminating noise and bringing about sudden changes, e.g. a binary output threshold comparator. The resulting signal SP has the shape indicated in FIG. 4a, each pulse corresponding to a perforation. The starting point 02 of the special scan has a clearly defined position in x and y relative to the center O of the image of the tube on the film. The straight line of direction y scanned over a given length as from point 02 passes on the one hand to a certain number of lateral perforations PF giving rise to the pulses of FIG. 4a and on the other hand coded inscriptions MB carried by the film in the form of transparencies in the spaces between the perforations. The resulting signal shown in FIG. 4b corresponds to the example of FIG. 2. The inscriptions MB are produced during the recording of the map in relation to the latter in order to identify the position in y of the successive images recorded and to some extent permits a numbering. The digital word SP obtained at the output of threshold detector 16 is transmitted to computer 11 by means of an interface circuit 17, which more particularly incorporates a shift register constituting a buffer store on the output side towards the computer. The other circuits of block 17, which constitutes a matching circuit, for asynchronous communication, serve to preserve information SP constituted by pulses of different widths (FIG. 4b) for its storage in a transfer store.

Operation takes place in the following manner. On the basis of aircraft position data, particularly the latitude, microprocessor 11 determines the positioning value in y of the film which must be read by the spot during the lateral scan. It calculates accurately in magnitude and in sign, the difference between said nominal value and the value SP which is actually read. After analog conversion, the difference constitutes the positioning error signal SC controlling the servo-motor 15. The latter has power amplifiers for controlling a servo-motor, which supplies spools 13, 14 in the desired direction until the circuit is stabilized, i.e. up to the cancelling out of error SC. Thus, the system makes it possible to bring about in a continuous and quasi-instantaneous manner the fine adjustment in y of film 1. It is possible to code each gap between the perforations with transparencies MB, or every other gap or even fewer. The important thing is to read information MB during a random lateral scan, or in other words the maximum spacing of inscriptions MB is a function of the amplitude of the lateral scan in y.

The organization of the map supporting film can be of the type shown in FIG. 5. The topographical map to be recorded CG is virtually cut into parallel strips B1, B2, B3, each forming the object of a photographic range. For standardization reasons, the map generally has NORTH upwards. To ensure that the representative point does not fall outside the map, the ranges overlap by quantity Δx. The thus formed document permits a virtually continuous representation of any road or route, no matter what its geographical direction.

The transverse image dimension can be chosen in such a way that it essentially corresponds to the overlap width Δx of the strips. In a possible embodiment based on FIG. 2, the presentation format is square, the displayed image is 125×125 mm and the equivalent magnification of the system is 15 giving a width of Δx=8.33 mm i.e. slightly more than one third of the width of the standard image (24 mm) on a 35 mm film. As the moving-map display also performs image rotations, it must be able to read over the greatest possible height, i.e. parallel to the main direction of the film, a range having a width at least equal to 8.33×√2, i.e. 11.8 mm corresponding to the diagonal of the presented image (this case occurs when the map is to be shown with NW or NE or SW or SE at the top).

During the passage from one strip to the next, as a result of the advance of the vehicle, the film must undergo a significant displacement in y (jumping strips) under the aforementioned recording conditions.

During these rapid movement phases of the film corresponding to a coarse setting in y, the spot is kept stationary at point 02 and the microprocessor counts the transitions due to perforations PF (wide pulses of signal SP). The processor 11 receives latitude data from the navigational system and, by comparing the two magnitudes, controls the servo-motors 15 of the movement at y of the film up to the desired position with a precision equal to the spacing of the perforations. This is followed by the fine setting or adjustment, as described hereinbefore.

The initial setting of the moving-map display can be produced by means of a test view carried by the film of the type shown in FIG. 6. The cross CX is centered on the film during recording and is symmetrical with respect to directions x or y. Computer 11 controls a line-by-line scan at x of the spot over the entire width of the film. Signal SP detected by circuit 16 is used by the computer for determining the center of the cross and then the initial directions ox, oy. The view may also include coded data, IF, in the form of transparencies positioned in a transverse direction to indicate the numbered coordinate of center O of the cross, the number of the film, the identification of the filmed documents, etc.

Numerous different types of images can be used for the initialization of the positioning. For intermediate resettings, it is possible to use simple images of the type shown in FIG. 7, or geographical information given by the center of circle CR is calculated on the basis of mean values, and/or the marking information is given in analog form by the diameter of the circle, e.g. is variable from one image to the next.

The reading of the test image, e.g. the cross of FIG. 6, the determination of the value in the center and its storage constitute the marking of the spot at x and are used for the possible resetting of the scanning device.

In those parts of the film where the positioning accuracy is more important, each film zone is followed by a test image permitting resetting and numbering of the zones. Thus, for each zone change, the device can be reset. This can also take place periodically, when the system is working on the same zone for an excessive period of time by having access to the closest test image.

The film can have one or more test images, e.g. in the form of a grid shown in FIG. 8 for linearity corrections.

The scanning signal values corresponding to the transmissions detected by the image reader are introduced into the computer store and these values permit a linearity correction of the complete reading chain. The greater the number of lines traced the better this correction.

What is claimed is:

1. A moving-map display with recording of a map on a photographic film carried by spools, comprising:
   a video image reader using a line-by-line scanner which scans a map image formed on said film,
   a computer for generating position servo-control data to control scanning of the film image of the basis of heading, longitude and latitude parameters of a vehicle carrying the moving-map display,
   said computer comprising means for electronically correcting said servo-control data to take account both rotation due to the heading and translations in x transverse with respect to the film to be produced as a function of the longitude, as well as a servo-control in y of the film in the longitudinal direction by rotation of the spools as a function of the latitude,
   said film comprising successive images forming said recorded map, lateral perforations, and coded inscriptions between the perforations, said coded inscriptions corresponding to numbering of said images,
   said computer also comprising means for controlling said image reader to produce a cyclic lateral scan in y at the location of a row of said perforations to produce longitudinal position information and permit the calculation of fine resetting data in y to be transmitted to the servo-control based on the position of said perforations relative to said inscriptions, and
   displaying means comprising a cathode-ray indicator for displaying a corrected video image corresponding to the map image scanned by said reader based on the corrrected control data.

2. A movving-map display according to claim 1, wherein the said coded inscriptions are in the form of transparencies recorded between the perforations for forming together a digital word indicating the precise positioning in y of the film by said lateral scan.

3. A moving-map display according to claim 2, wherein the video image reader incorporates at least one detecting channel connected to a digital output threshold detector connected via a buffer store interface circuit to the computer for the transmission of said digital word in y, the computer determining as a function of the latitude the true positioning data in y and calculating the difference in magnitude and sign constituting the precise resetting data applied to the servo-motor after analog conversion.

4. A moving-map display according to claim 1, wherein the scan generator or circuit has a channel in x and a channel in y, each formed by a flip-flop register in series with a buffer store, followed by a digital-analog converter supplying a terminal amplifier.

5. A moving-map display according to claim 1, wherein it also incorporates means for the readjustment of the scanning spot by reading test images carried on the film.

6. A moving-map display according to claim 5, wherein the test images have a cross centered on the film and symmetrical with respect to the median longitudinal direction of the film.

7. A moving-map display according to claim 5, wherein the test images incorporate a circle centered on the film on the longitudinal median axis.

8. A moving-map display according to claim 1, wherin it also incorporates means for the linearity control of the video image reader by reading test images carried by the film.

9. A moving-map display according to claim 8, wherein the linearity control means comprise test images representing grids.

10. A moving-map display according to claim 1, used in an aerial navigation system for displaying the overflown area on a cathode-ray indicator, together with navigational information.

* * * * *